US007234697B2

(12) United States Patent
Okada

(10) Patent No.: US 7,234,697 B2
(45) Date of Patent: Jun. 26, 2007

(54) GAMING MACHINE

(75) Inventor: Kazuo Okada, Tokyo (JP)

(73) Assignee: Aruze Corporation, Tokyo (JP)

( * ) Notice: Subject to any disclaimer, the term of this patent is extended or adjusted under 35 U.S.C. 154(b) by 781 days.

(21) Appl. No.: 10/697,258

(22) Filed: Oct. 31, 2003

(65) Prior Publication Data

US 2004/0209682 A1 Oct. 21, 2004

(30) Foreign Application Priority Data

Dec. 27, 2002 (JP) ............................ 2002-382431

(51) Int. Cl.
*A63F 1/18* (2006.01)
*A63F 13/00* (2006.01)

(52) U.S. Cl. .................................................. 273/143 R

(58) Field of Classification Search ..................... None
See application file for complete search history.

(56) References Cited

U.S. PATENT DOCUMENTS 5,580,055 A * 12/1996 Hagiwara ............... 273/143 R
6,456,344 B1 9/2002 Nemoto et al.
2003/0087690 A1 5/2003 Loose et al.
2004/0209682 A1 10/2004 Okada

FOREIGN PATENT DOCUMENTS

JP 2002-301195 A 10/2002

OTHER PUBLICATIONS

European Search Report, Ref. 102 526 a/scho.

* cited by examiner

*Primary Examiner*—Mark Sager
(74) *Attorney, Agent, or Firm*—Rader, Fishman & Grauer PLLC

(57) ABSTRACT

A gaming machine disclosed includes a rotary reel having a plurality of symbols on an outer periphery thereof, a group of sheet members disposed in front of the rotary reel, the sheet members being laminated each other and each having an opening, a liquid crystal panel disposed in front of the sheet members, wherein the plurality of symbols are recognizable through the opening on each of the sheet members, from a front side of the gaming machine, and wherein each of the sheet members includes; a light guiding material, and a light diffusion material disposed in front of the light guiding material and having a larger opening than an opening of the light guiding material, or each of the sheet members includes a light reflecting material, and a light transmitting material disposed in front of the light reflecting material and having a larger opening than an opening of the light reflecting material.

2 Claims, 14 Drawing Sheets

GAMING MACHINE

FIELD OF TECHNOLOGY

The present invention relates to a gaming machine.

DESCRIPTION OF RELATED ART

Gaming machines have acquired a favorable reputation, which display rotatable reels variably and stationarily, the rotatable reels having a plurality of symbols drawn on the outer peripheries of them, and which make a player have continuous interest in a game to make the player not get tired of the game, by paying out game mediums such as pachinko balls or game medals based on combinations of a plurality of symbols displayed stationarily.

In a slot machine known as a kind of these gaming machines, a liquid crystal display device for indicating a sign of an outcome of an internal lottery and the like has become an important component, in the sense of stirring up the interest of a player, in addition to a reel variable-display unit. The liquid crystal display device is, conventionally, disposed at a place, normally an area under or beside the reel variable-display unit, where a player is able to visually identify the liquid crystal display device and the variable-display unit at a time.

On the other hand, a gaming machine having a liquid crystal display device provided forward of a variable-display unit has come to be sold, because the parts constituting the liquid crystal display device have become cheap in recent several years, and in order to stir up the interest of a player more than a conventional gaming machine.

For example, see Japanese Patent Application KOKAI Publication No. 2002-301195 (page 3 and FIG. 1).

However, when a liquid crystal display is adhered forward of the reel variable-display unit, since the parts constituting the liquid crystal display device include a reflective sheet having a high photoreflectivity, the symbols drawn on the outer peripheries of the reels are illegible because of dimness. This obstructs not only a beginner player but also an advanced-level player in pulling a lever or pushing a button with good timing while seeing the symbols on the reels, and thereby has been criticized by the player.

SUMMARY OF THE INVENTION

It is therefore an object of the present invention to solve the problem that when a player plays a game at a gaming machine having a liquid crystal display device adhered forward of a reel variable-display unit, the symbols on the reels are illegible because of dimness and thereby the player is obstructed in pulling a lever or pushing a button with good timing while seeing the symbols, and to provide an environment in which the player is absorbed in a game without losing interest in the game.

In order to achieve the above object, the present invention provides a gaming machine comprising a rotary reel having a plurality of symbols on an outer periphery thereof, a group of sheet members disposed in front of the rotary reel, the sheet members being laminated each other and each having an opening, a liquid crystal panel disposed in front of the sheet members, wherein the plurality of symbols are recognizable through the opening on each of the sheet members, from a front side of the gaming machine, and wherein each of the sheet members includes, a light guiding material, and a light diffusion material disposed in front of the light guiding material and having a larger opening than an opening of the light guiding material.

More specifically, the present invention provides a gaming machine described below.

The gaming machine of the present invention comprises a rotary reel having a plurality of symbols on an outer periphery thereof, a group of sheet members disposed in front of the rotary reel, the sheet members being laminated each other and each having an opening, and a liquid crystal panel disposed in front of the sheet members wherein the plurality of symbols are recoginizable through the opening on each of the sheet members, from a front side of the gaming machine, and wherein each of the sheet members includes a light reflecting material and a light transmitting material disposed in front of the light reflecting material and having a larger opening than an opening of the light reflecting material.

According to the present invention as described above, the gaming machine of the present invention comprises rotary reels, on the outer peripheries of which a plurality of discrimination information are drawn, a group of sheet-type components provided forward of the rotary reels and consisting of a plurality of sheet-type components which are laminated and each of which is provided with an opening, and a liquid crystal panel provided forward of the group of sheet-type components, wherein the plurality of discrimination information are legible through the openings of the plurality of sheet-type components from the front of the gaming machine, and the group of sheet-type components includes a light conductive material and a light diffusive material which is provided forward of the light conductive material and in which an opening larger than the opening formed in the light conductive material is formed. Therefore, most of light to be emitted from the light conductive material enters the whole of the liquid crystal panel evenly after emitted from the light conductive material, or enters an area of the liquid crystal panel corresponding to the area other than the opening of the light diffusive material evenly after diffused by the light diffusive material. Since, however, the opening of the light conductive material is larger than the opening of the light diffusive material, the amount of light incident on the area of the liquid crystal panel corresponding to the area of the opening of the light diffusive material is less than the amount of light incident on the area of the liquid crystal panel corresponding to the area other than the opening of the light diffusive material.

Thus, the area of the liquid crystal panel which a player cannot help seeing when seeing the discrimination information is darker than that in case that the opening of the light conductive material and the opening of the light diffusive material are not provided like a conventional gaming machine, and thereby the discrimination information can be recognized clearly.

As a result, the present invention solves the problem that when a player plays a game at a gaming machine having a liquid crystal display device adhered forward of a reel variable-display unit, the discrimination information on the reels are illegible because of darkness and thereby the player is obstructed in pulling a lever or pushing a button with good timing while seeing the discrimination information, and provides an environment in which the player is absorbed in a game without losing interest in the game.

The present invention also provide a gaming machine comprising a rotary reel having a plurality of symbols on an outer periphery thereof, a group of sheet members disposed in front of the rotary reel, the sheet members being laminated each other and each having an opening, and a liquid crystal panel disposed in front of the sheet members wherein the plurality of symbols are recoginizable through the opening on each of the sheet members, from a front side of the gaming machine, and wherein each of the sheet members includes a light reflecting material and a light transmitting material disposed in front of the light reflecting material and having a larger opening than an opening of the light reflecting material.

According to the present invention as described above, the gaming machine comprises rotary reels, on the outer peripheries of which a plurality of discrimination information are drawn, a group of sheet-type components provided forward of the rotary reels and consisting of a plurality of sheet-type components which are laminated and each of which is provided with an opening, and a liquid crystal panel provided forward of the group of sheet-type components, wherein the plurality of discrimination information are legible through the openings of the plurality of sheet-type components from the front of the gaming machine, and the group of sheet-type components includes a light reflecting material and a light transmitting material which is provided forward of the light reflecting material and in which an opening larger than the opening formed in the light reflecting material is formed. Therefore, the plurality of discrimination information which are illegible for a player in case of a conventional gaming machine because most of the light emitted from the plurality of discrimination information is blocked by the light reflecting material having a high light-reflectivity, becomes more legible for a player than the conventional gaming machine because the light emitted from the plurality of discrimination information is less blocked by the light reflecting material than the conventional gaming machine because of the opening of the light reflecting material provided for the inventive gaming machine.

Furthermore, since the opening of the light reflecting material is smaller than the opening of the light transmitting material, it is considered that most of light emitted from the light transmitting material enters the substantial whole of the liquid crystal panel evenly after emitted to the opposite of the light reflecting material, or enters an area of the liquid crystal panel corresponding to the area other than the opening of the light reflecting material after reflected by the light reflecting material having a high light-reflectivity. But the amount of light incident on the area of the liquid crystal panel corresponding to the area of the opening of the light transmitting material is less than the amount of light incident on the area of the liquid crystal panel corresponding to the area other than the opening of the light transmitting material according to the presence or absence of incident light mentioned above.

Thus, the area of the liquid crystal panel which a player cannot help seeing when seeing the discrimination information is darker than that in case that the opening of the light reflective material and the opening of the light transmitting material are not provided like a conventional gaming machine, and thereby the discrimination information can be recognized clearly.

As a result, the present invention solves the problem that when a player plays a game at a gaming machine having a liquid crystal display device adhered forward of a reel variable-display unit, the discrimination information on the reels are illegible because of darkness and thereby the player is obstructed in pulling a lever or pushing a button with good timing while seeing the discrimination information, and provides an environment in which the player is absorbed in a game without losing interest in the game.

The "light transmitting material" of the present invention may include the "light conductive material" or "light diffusive material" mentioned above, or include both of the "light conductive material" or "light diffusive material".

Furthermore, the gaming machine of the present invention may further comprise a light source unit for illuminating the plurality of discrimination information.

The gaming machine of the present invention as described above comprises a light source unit for lighting the plurality of discrimination information. Therefore, most of light to be emitted from the light conductive material enters the whole of the liquid crystal panel evenly after emitted from the light conductive material, or enters an area of the liquid crystal panel corresponding to the area other than the opening of the light diffusive material evenly after diffused by the light diffusive material. Since, however, the opening of the light conductive material is larger than the opening of the light diffusive material, the amount of light incident on the area of the liquid crystal panel corresponding to the area of the opening of the light diffusive material is less than the amount of light incident on the area of the liquid crystal panel corresponding to the area other than the opening of the light diffusive material.

Thus, the area of the liquid crystal panel which a player cannot help seeing when seeing the discrimination information is darker than that in case that the opening of the light conductive material and the opening of the light diffusive material are not provided like a conventional gaming machine, and thereby the discrimination information (symbol) can be recognized clearly.

Furthermore, the plurality of discrimination information which are illegible for a player in case of a conventional gaming machine because most of the light emitted from the plurality of discrimination information is blocked by the light reflecting material having a high light-reflectivity, becomes more legible for a player than the conventional gaming machine because the light emitted from the plurality of discrimination information is less blocked by the light reflecting material than the conventional gaming machine because of the opening of the light reflecting material provided for the inventive gaming machine.

Furthermore, since the opening of the light reflecting material is smaller than the opening of the light transmitting material, it is considered that most of light emitted from the light transmitting material enters the substantial whole of the liquid crystal panel evenly after emitted to the opposite of the light reflecting material, or enters an area of the liquid crystal panel corresponding to the area other than the opening of the light reflecting material after reflected by the light reflecting material having a high light-reflectivity. But the amount of light incident on the area of the liquid crystal panel corresponding to the area of the opening of the light transmitting material is less than the amount of light incident on the area of the liquid crystal panel corresponding to the area other than the opening of the light transmitting material according to the presence or absence of incident light mentioned above.

Thus, the area of the liquid crystal panel which a player cannot help seeing when seeing the discrimination information is darker than that in case that the opening of the light reflective material and the opening of the light transmitting material are not provided like a conventional gaming machine, and thereby the discrimination information can be recognized clearly.

As a result, the present invention solves the problem that when a player plays a game at a gaming machine having a liquid crystal display device adhered forward of a reel variable-display unit, the discrimination information on the reels are illegible because of darkness and thereby the player is obstructed in pulling a lever or pushing a button with good timing while seeing the discrimination information, and provides an environment in which the player is absorbed in a game without losing interest in the game.

This is a perspective view showing the outline of a slot machine according to the present invention.

[FIG. 2]

This is a schematic diagram showing a display screen of a slot machine according to the present invention.

[FIG. 3]

This is a schematic diagram showing a display screen of a slot machine according to the present invention.

[FIG. 4]

This is a schematic diagram showing a display screen of a slot machine according to the present invention.

[FIG. 5]

This is a perspective view showing the outline of a slot machine according to the present invention.

[FIG. 6]

This is an illustrative diagram showing the display device of a slot machine according to the present invention.

[FIG. 7]

This is an illustrative diagram showing the liquid crystal display device of a slot machine according to the present invention.

[FIG. 8]

This is an illustrative diagram showing the liquid crystal display device of a slot machine according to the present invention.

[FIG. 9]

This is an illustrative diagram showing the display device of a slot machine according to the present invention.

[FIG. 10]

This is a block diagram showing a circuit configuration of a slot machine according to the present invention.

[FIG. 11]

This is a block diagram showing a circuit configuration of a slot machine according to the present invention.

[FIG. 12]

This is a block diagram showing a circuit configuration of a slot machine according to the present invention.

[FIG. 13]

This is a block diagram showing a circuit configuration of a slot machine according to the present invention.

[FIG. 14]

This is a block diagram showing a circuit configuration of a slot machine according to the present invention.

DETAILED DESCRIPTION OF THE INVENTION

An embodiment of the present invention is described below with reference to the drawings. The embodiment is a slot machine according to the present invention using a plurality of mechanical reels as a variable display device for variably displaying two or more kinds of images necessary for games. However, the present invention may be embodied in not only slot machines but also various gaming machines such as pachinko gaming machines, medal gaming machines, card gaming machines, and the like. Furthermore, this embodiment is described as a slot machine to be sold in Japan, but the present invention may also be applied to a slot machine to be sold in foreign countries.

[Configuration of Slot Machine]

Figure 1:
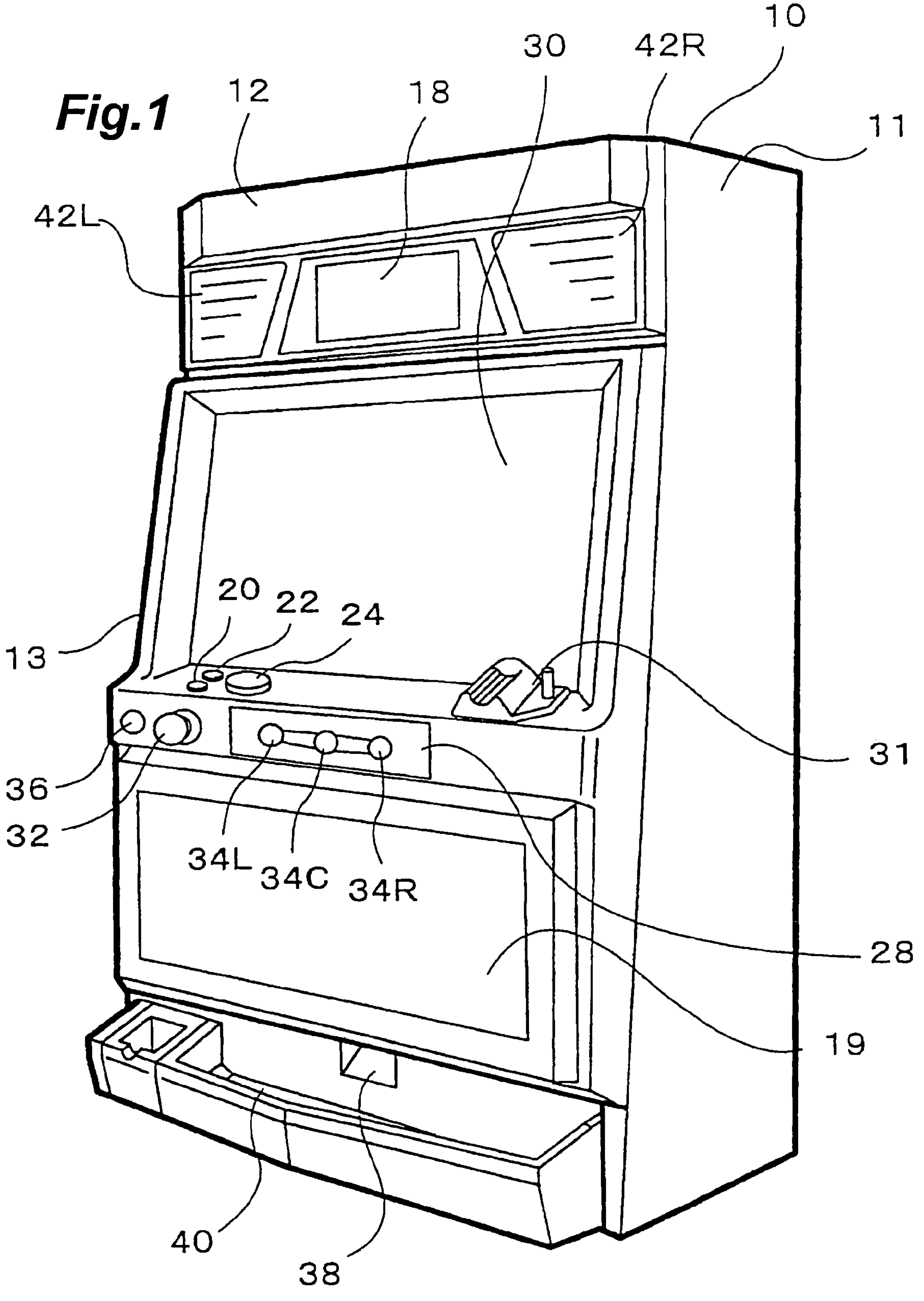
[FIG. 1]

The outline of a slot machine 10 is shown in FIG. 1.

The cabinet 12 forming the outer part of the slot machine 10 consists of a main body 11 and a door 13.

On the front of the cabinet 12 forming the whole of the slot machine 10, a rectangular display device 30 is provided. On the display device 30, as described later, various images such as notifying images for contents of games, effect images for pleasing players, and the like are displayed.

As described later in detail, the display device 30 is capable of controlling displayed images such that they have a relatively high transparency, and hence it becomes possible that the display device 30 allows a player to visually identify the rotary reels 26L, 26C, and 26R (see FIG. 2) provided at the back of the display device 30.

The display panel 30 is provided with a touch panel 51 (see FIG. 6), which allows player's various operations.

Figure 2:
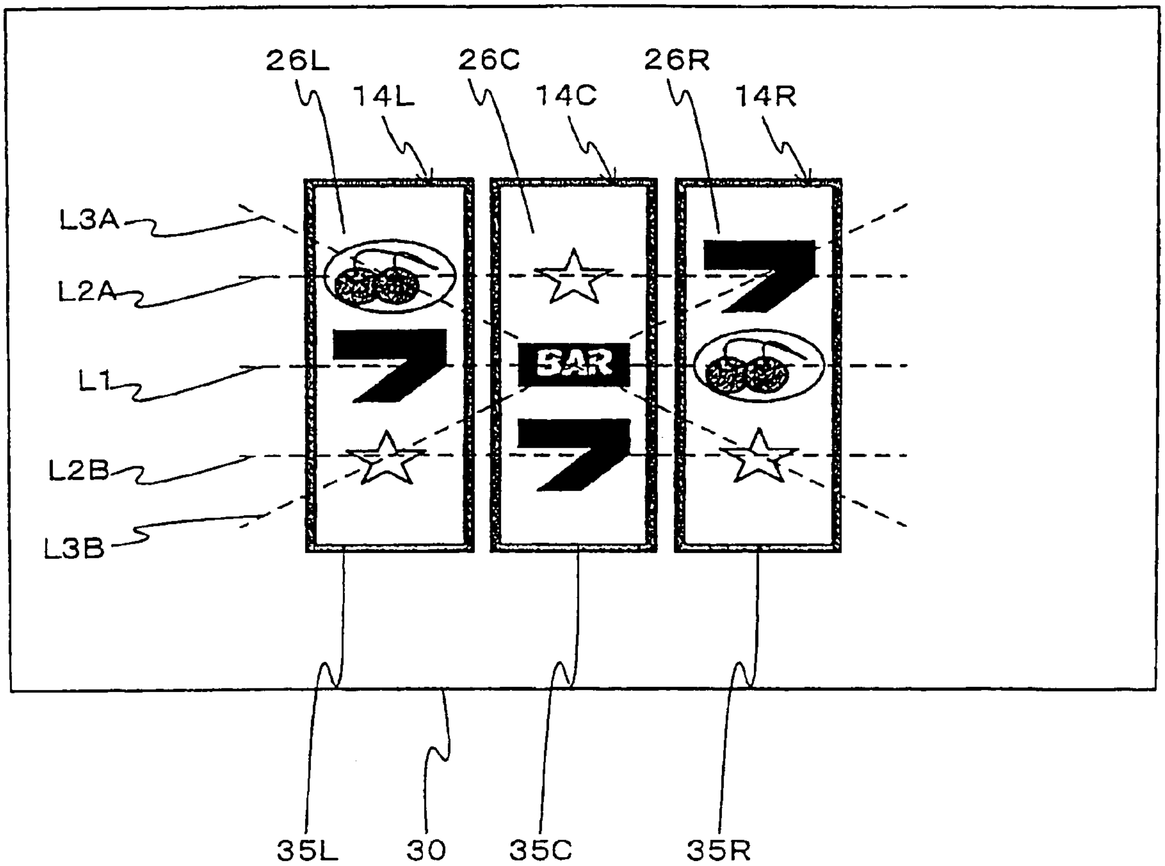

Furthermore, on the back of the display device 30, rectangular display windows 14 (1L, 14C, and 14R) are provided as shown in FIG. 2. A mask 33 (see FIG. 4) surrounding the display windows 14 is so provided as described later that a player can visually identify only the reels 26L, 26C, and 26R when the display device 30 displays an image in a state that it has relatively high transparency.

Inside of the cabinet 12, three reels 26L, 26C, and 26R, on the outer peripheries of which two or more kinds of symbols are drawn, are provided rotatably. Each of the reels 26L, 26C, and 26R is provided so as to be visible through the display windows 14 mentioned above. The "symbols" correspond to "discrimination information" described in the claims.

Furthermore, as described later, the reels 26L, 26C, and 26R are rotated in such a manner that the symbols drawn on the outer periphery of the reels 26L, 26C, and 26R are seen through the display windows 14 as if they are moving from top to bottom. When each of the reels 26L, 26C, and 26R has stopped, three of the symbols drawn on the outer periphery of each of the reels stop so as to be visible through the display windows 14.

Furthermore, as shown in FIG. 1, under the display device 30, a generally horizontal base portion 28 is provided, and on the right top of it, a medal insertion slot 31 is provided.

On the left top of the base portion 28, a 1-BET switch 20 which is pushed one time when only one of the medals already inserted in the slot machine is bet, a 2-BET switch which is pushed one time when only two of the medals already inserted in the slot machine are bet, and a MAX-BET switch 24 which is pushed one time when the maximum number of medals of the medals already inserted in the slot machine which can be bet on one game are bet.

When a player operates the 1-BET switch 20, only the pay line L1 comprising, as shown in FIG. 2, a combination of three symbols each being the middle symbol of three visible symbols on each of the three reels becomes effective for the judgment of a game result (hereinafter a combination of symbols which becomes effective for the judgment of the game result is called "effective line").

Furthermore, when a player operates the 2-BET switch 22, three pay lines in total become effective which include the pay lines L2A and L2B comprising a combination of three symbols each being the upper symbol and lower symbol respectively of three visible symbols on each of the three reels in addition to the aforementioned effective line.

In addition, when the MAX-BET switch 24 is operated, if the number of medals already inserted in the slot machine is three or more, all of the five pay lines, i.e. the pay lines L1, L2A, L2B, L3A, and L3B become effective which include the pay line L3A comprising a combination of the upper symbol on the reel 26L, the middle symbol on the reel 26C, and the lower symbol on the reel 26R, and the pay line L3B comprising a combination of the lower symbol on the reel 26L, the middle symbol on the reel 26C, and the upper symbol on the reel 26R in addition to the aforementioned effective lines.

However, when the number of remaining medals already inserted in the slot machine is two, only the three pay lines L1, L2A, and L2B of the five pay lines become effective, and when the number of remaining medals is one, only the pay line L1 of the five pay lines becomes effective. Which of the pay lines has become effective is shown on a side portion of the display window 14 for notifying the player.

When a player pushes the BET switch 20, 22, or 24, the pay lines become effective according to which of the BET switches has pushed. When a player pushes the 1-BET switch 20, 2-BET switch, or MAX-BET switch 24, the slot machine comes to the state of enabling starting a game.

Furthermore, as shown in FIG. 1, a start lever 32 is provided tiltably on the left front of the base portion 28. When a player tilts the start lever 32, the aforementioned three reels 26L, 26C, and 26R start to rotate at the same time. When the three reels 26L, 26C, and 26R rotate, the symbols drawn on the outer peripheries of the reels 26L, 26C, and 26R are variably displayed through the display windows 14. When the reel rotation speed of the aforementioned three reels 26L, 26C, and 26R have reached to a predetermined speed, the operations of the reel stop buttons 34L, 34C, and 34R, described later, by a player become effective.

On the middle front of the base portion 28, the three reel stop buttons 34L, 34C, and 34R are provided. The reel stop buttons 34L, 34C, and 34R correspond to the reels 26L, 26C, and 26R respectively. When a player pushes the reel stop button 34L, the reel 26L stops, when a player pushes the reel stop button 34C, the reel 26C stops, and when a player pushes the reel stop button 34R, the reel 26R stops.

At the left side of the start lever 32, a payout button 36 is provided. When a player pushes the payout button 36, medals inserted in the slot machine are paid out from the medal payout opening 38 provided at the lower front of the slot machine, and then stored in the medal receiving unit 40.

Furthermore, above the medal receiving unit 40, speaker grills 42 are provided through which sound emitted from the speakers 46 (see FIG. 10) mounted inside of the cabinet 12 is output.

On the outer periphery of each of the aforementioned reels 26L, 26C, and 26R, a predetermined number e.g. 21 of images including two or more kinds of images are drawn. According to the arrangement of these images which are visible through the display windows 14 when the rotation of each of the reels 26L, 26C, and 26R has stopped, payout of medals, progress of the game to a state which is advantageous to the player, or the like is conducted.

[Display of Slot Machine]

As described above, the display device 30 is described below with reference to FIGS. 2 to 4.

The display device 30 is capable of displaying various images including high-transparency images. The "high-transparency image" means an image formed in a color tone which is substantially light transparent on the liquid crystal display device, and when displayed on the display windows 14, the symbols on the reels at the back of the display windows can be identified visually although degrees of display vary according to color tones to be used. Further, such images allow various images and high-transparency images to be displayed not only as a whole but also partially.

For example, the display device 30 performs displaying along the display windows 14 in such a way that the transparency becomes high, so that the reels 26L, 26C, and 26R provided at the back of the display windows can be identified visually by a player as shown in FIG. 2. Further, at the outer edges of the reels 26L, 26C, and 26R, edging images 35 (35L, 35C, and 35R) are displayed.

Figure 3:
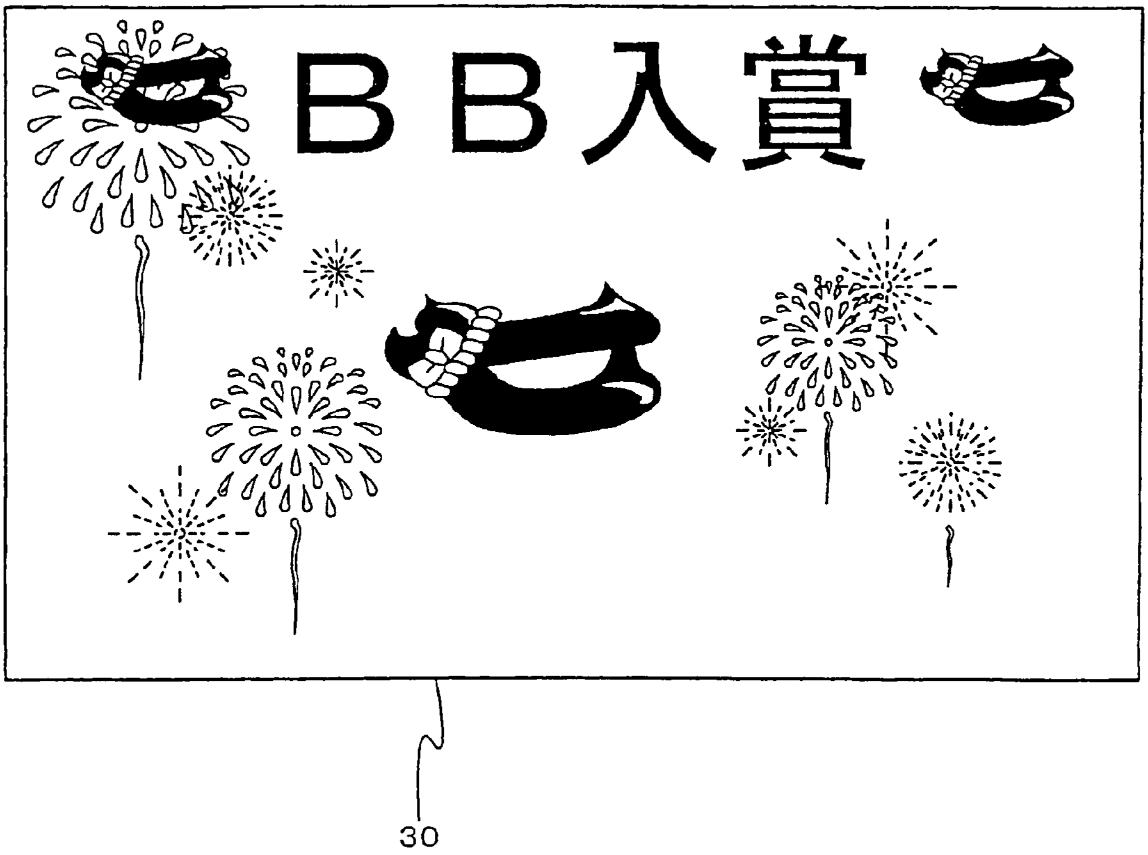

Furthermore, in addition to that the display device 30 performs displaying in such a way that the transparency of it becomes high, various effect images using low transparency color tones (so-called "black output") can be displayed, as shown in FIG. 3, in such a way that a player can not visually identify the reels 26L, 26C, and 26R provided at the back of the display device 30.

Figure 4:
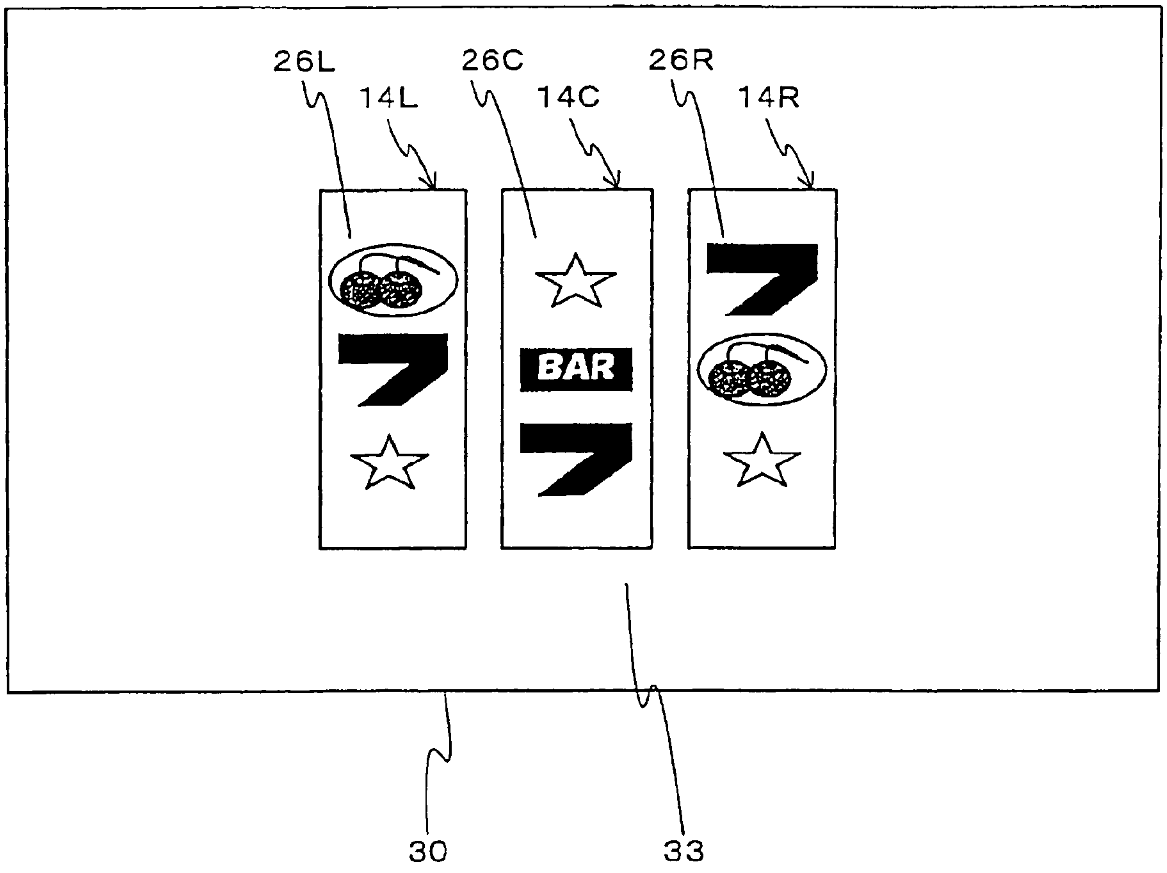

Furthermore, the display device 30 can perform displaying in such a way that the transparency of the whole of it becomes high, as shown in FIG. 4, so that a player can visually identify the reels 26L, 26C, and 26R through the display windows 14, and can visually identify the mask 33 provided around the display windows 14. In this way, since the mask 33 is provided, only necessary minimum parts to be visually identified by a player are actually visible, but the other parts are not visible.

[Configuration of Boards of Slot Machine]

Figure 5:
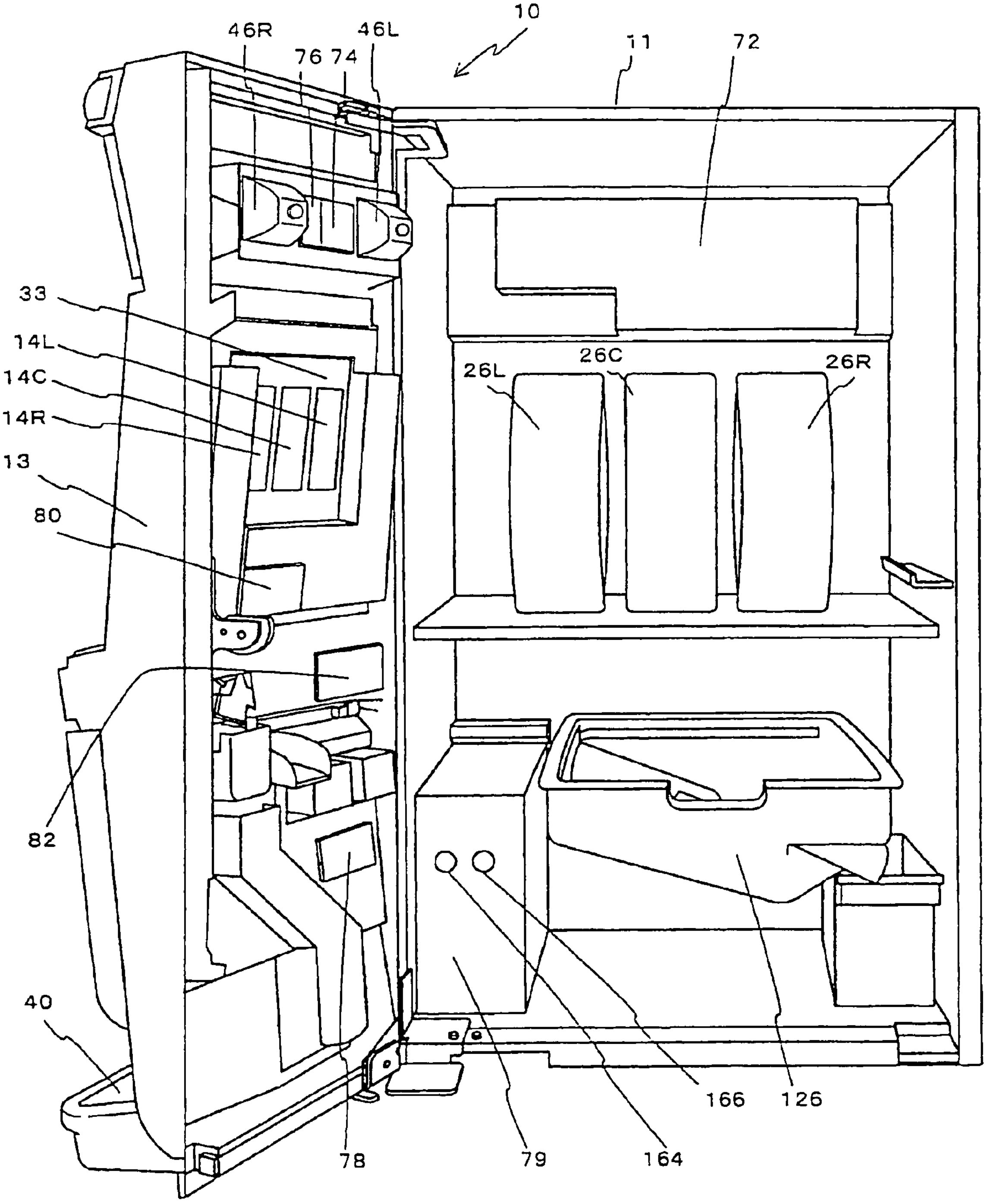

FIG. 5 is a schematic diagram showing the inside of the cabinet of the slot machine. In FIG. 5, the door 13 of the slot machine 10 is opened.

As shown in FIG. 5, the slot machine 10 is provided with various devices and control boards in it.

Figure 10:
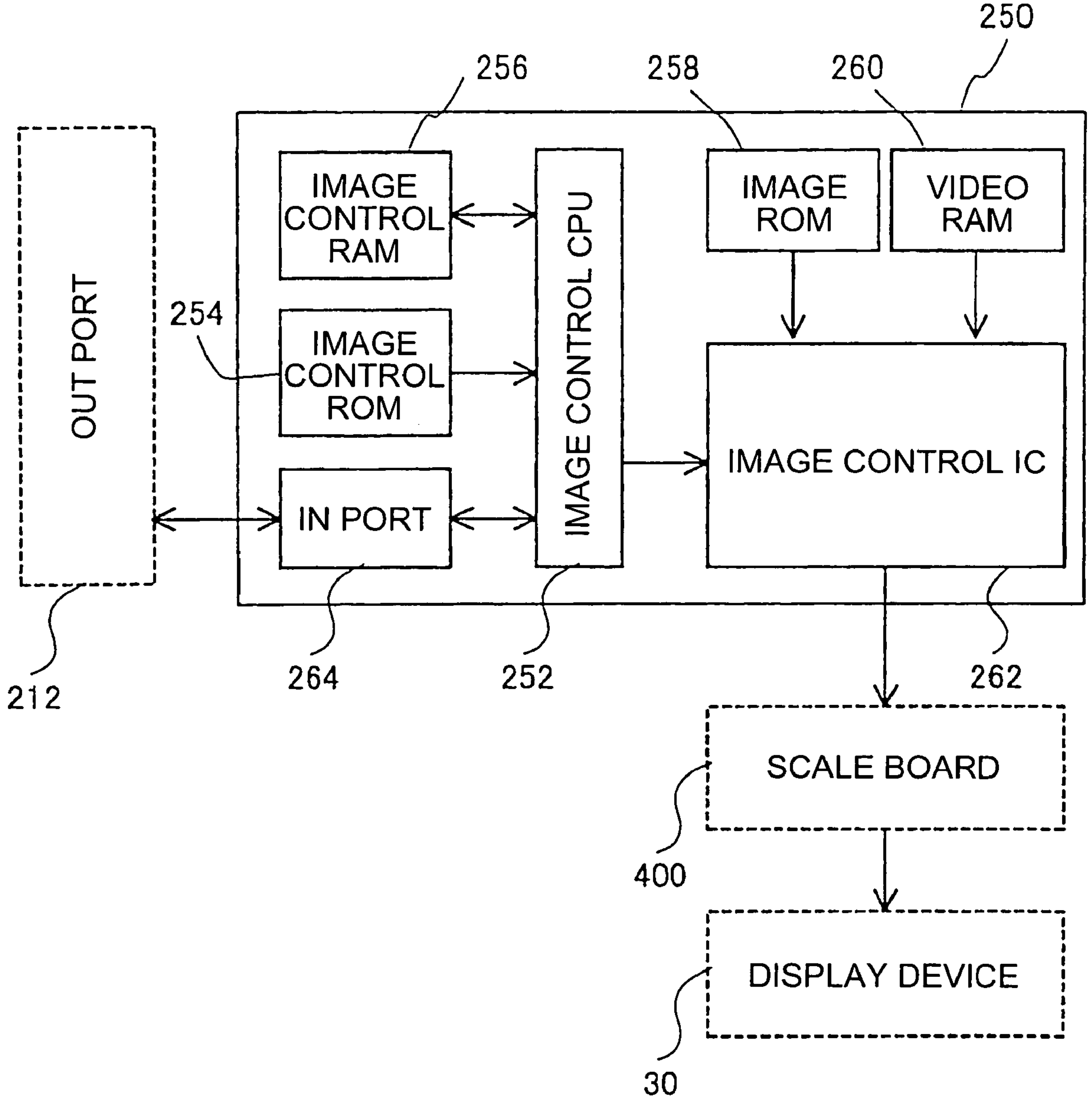

The main body 11 of the slot machine 10 is provided with, as shown in FIG. 5, various boards and devices including reels 26L, 26C, and 26R, a hopper 126 capable of storing game mediums, and a power source device 79 for supplying electric power to the whole of the slot machine 10, and in addition, a main control board 72 on which a main control circuit 100 (see FIG. 10) is mounted, containing a random number generator 116 for generating random numbers used for determining by lot whether a condition advantageous to a player is generated (see FIG. 10), and a main CPU 102 (see FIG. 10).

On the other hand, the door 13 of the slot machine 10 is provided with, as shown in FIG. 5, various devices and control boards including a sub-control board 74, a scale board 76, a lamp control board 78, an image display subsidiary board 80, and a power source relay board 82.

These boards contain various circuits.

The sub-control board 74 contains a sub-control circuit 200 (see FIG. 10) which determines various effects based on or not based on signals and/or commands from the main control circuit 100.

The scale board 76 contains a scale circuit 400 (see FIG. 10) which applies an enlarging conversion to image signals supplied from the sub-control board 74, causes the display device 30 to display enlarged images, watches signals supplied from the sub-control board 74, and executes various controls of the display device 30 when determining that there is an abnormal condition.

The lamp control board 78 contains a lamp control circuit 300 (see FIG. 10) which produces lamp effects and sound effects based on effect signals supplied from the sub-control board 74.

The image display subsidiary board 80 contains an image display subsidiary circuit (not shown) which is a component of the display device 30, drives image signals supplied from the scale board 76, and controls the liquid crystal backlights 292 (see FIG. 13) of the display device 30.

The power source relay board 82 has a function of exclusively receiving electric power from the power source device 79 to distribute electric power to the boards and devices mentioned above individually.

The sub-control board 74 and the scale board 76 mentioned above are disposed at the upper part of the door 13.

The lamp control board 78 is disposed at the lower part of the door 13 from an arrangement viewpoint, because its output is less susceptible to noise and static electricity as compared with the sub-control board 74 and the scale board 76.

In the slot machine 10 of this embodiment, the main control board 72 is provided on the main body 11, and the sub-control board 74 and the other boards are provided on the door 13. However, the present invention is not limited thereto. The sub-control board 74 and the other boards may be provided on the main body 11, and the main control board 72 may be provided on the door 13.

Furthermore, the power source device 79 is provided with a reset switch 164, a setting switch 166, etc.

[Structure of Display Device]

Figure 6:
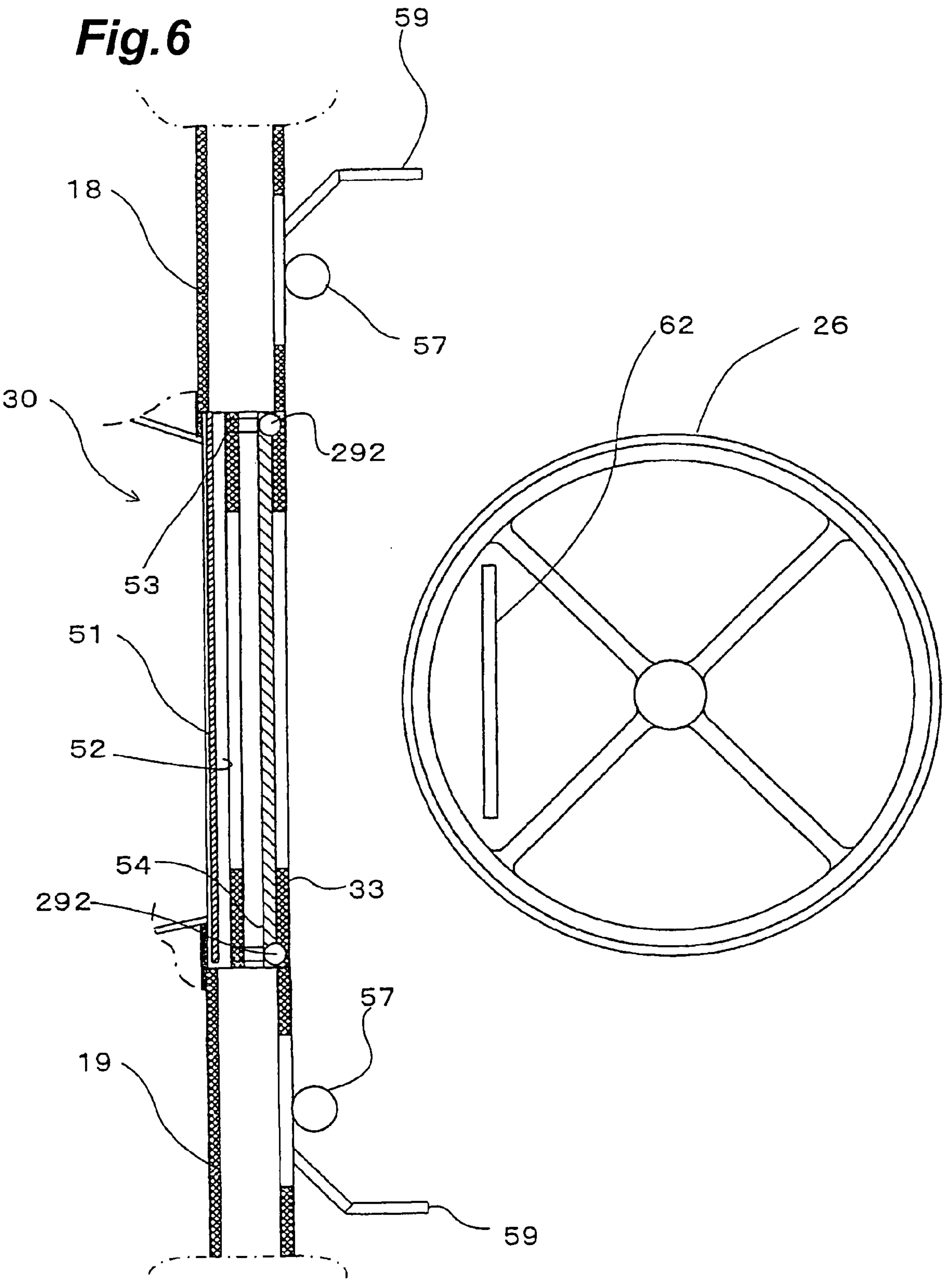

Next, the details of the display device 30 of the slot machine 10 will be described with reference to FIG. 6.

The door 13 is provided with the display device 30 by which various effect images are displayed.

The display device 30 comprises a touch panel 51 for detecting coordinates of points touched by a player, a transparent acryl plate 52 which is a protection cover, a symbol sheet 53 made of a transparent film on which various symbols are printed, and a liquid crystal display device 54 consisting of a transparent liquid crystal display device such as ITO; the symbol sheet 53 and the liquid crystal display device 54 are laminated at the inner surface of the transparent acryl plate 52.

The liquid crystal display device 54 is described below with reference to FIGS. 7 and 8.

Figure 7:
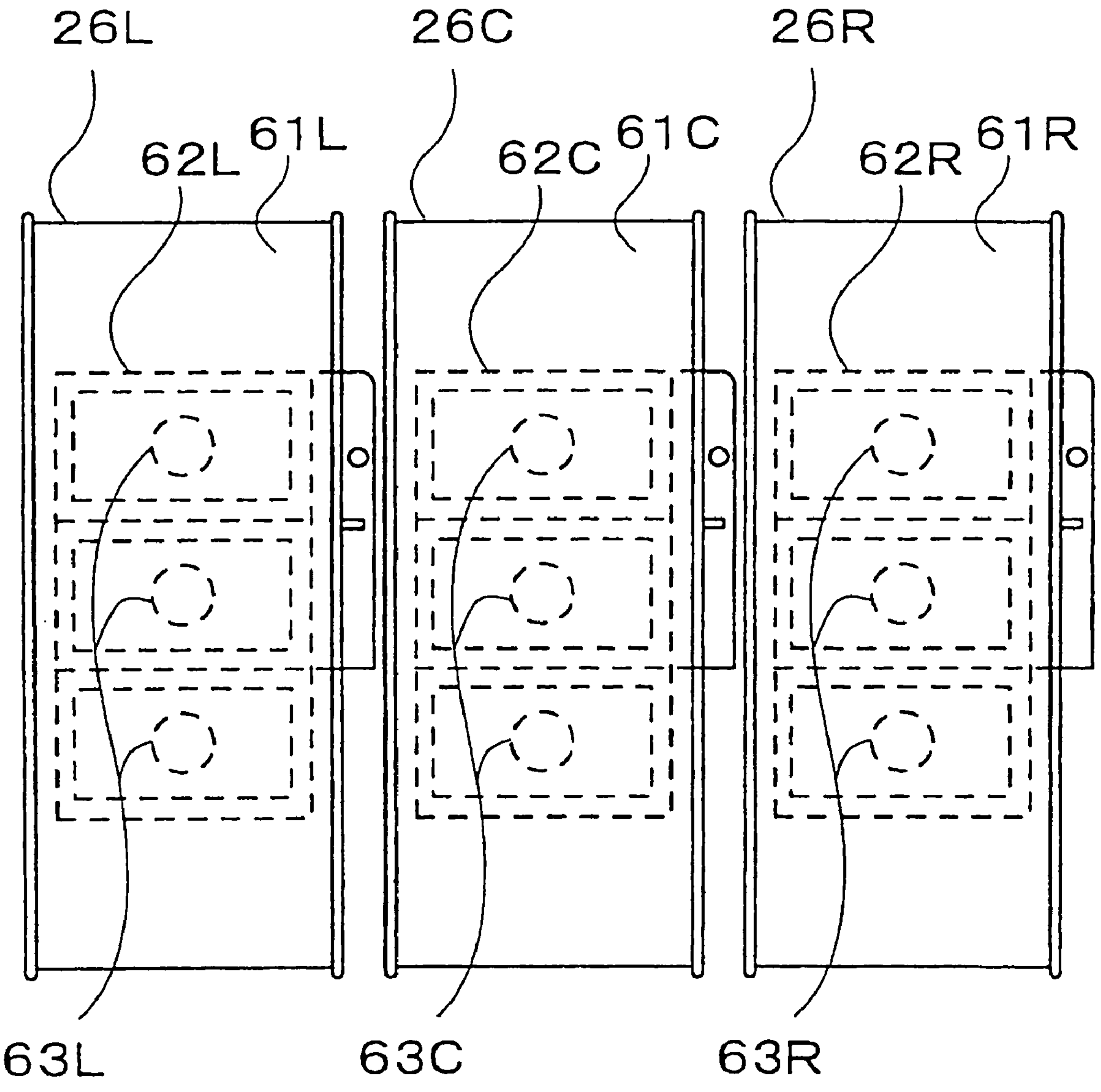

As shown in FIG. 7, the liquid crystal display device 54 comprises a liquid crystal 55, a diffusion sheet 56, a light conductive plate 57, a reflection sheet 58, and a rear frame 59, arranged in this order from the front.

For the light conductive plate 57, a specially-processed acryl board is used. The light conductive plate 57 conducts the light irradiated from the liquid crystal backlights 292 (see FIG. 6) described later. The conducted light travels in the acryl board while being reflected totally. During this travel, the light hits the reflection dots (not shown) formed in the acryl board and changes its orientation. Those components of the light reflected in a smaller angle than the total reflection angle are mainly emitted to the liquid crystal 55.

Furthermore, the diffusion sheet 56 is provided on the top of the light conductive plate in order to increase the brightness of the front of the liquid crystal 55 and reduce the unevenness of the brightness.

The reflection sheet 58 is used for reflecting back the light which has come out of the light conductive plate at the opposed side to the liquid crystal 55, and is made of high-reflectivity material.

In this connection, "light conductive plate" corresponds to "light conductive material" in the claims, "diffusion sheet" corresponds to "light diffusive material" in the claims, and "reflection sheet" corresponds to "light reflecting material" in the claims. Further, "light conductive plate" and "diffusion sheet" may correspond to "light transmitting material" in the claims.

In each of the diffusion sheet 56, light conductive plate 57, reflection sheet 58, and rear frame 59, a through-hole different from each other in size is formed. Through these through-holes, a player can visually identify the symbols drawn on the outer peripheries of the reels through the display windows 14.

In this connection, the "symbols drawn on the outer peripheries of the reels" need to include at least as many symbols as a player can play a game. In case of this embodiment, at least nine symbols on the five effective lines of L1, L2A, L2B, L3A, and L3B need to be able to be visually identified through the display windows 14 by a player.

Figure 8:
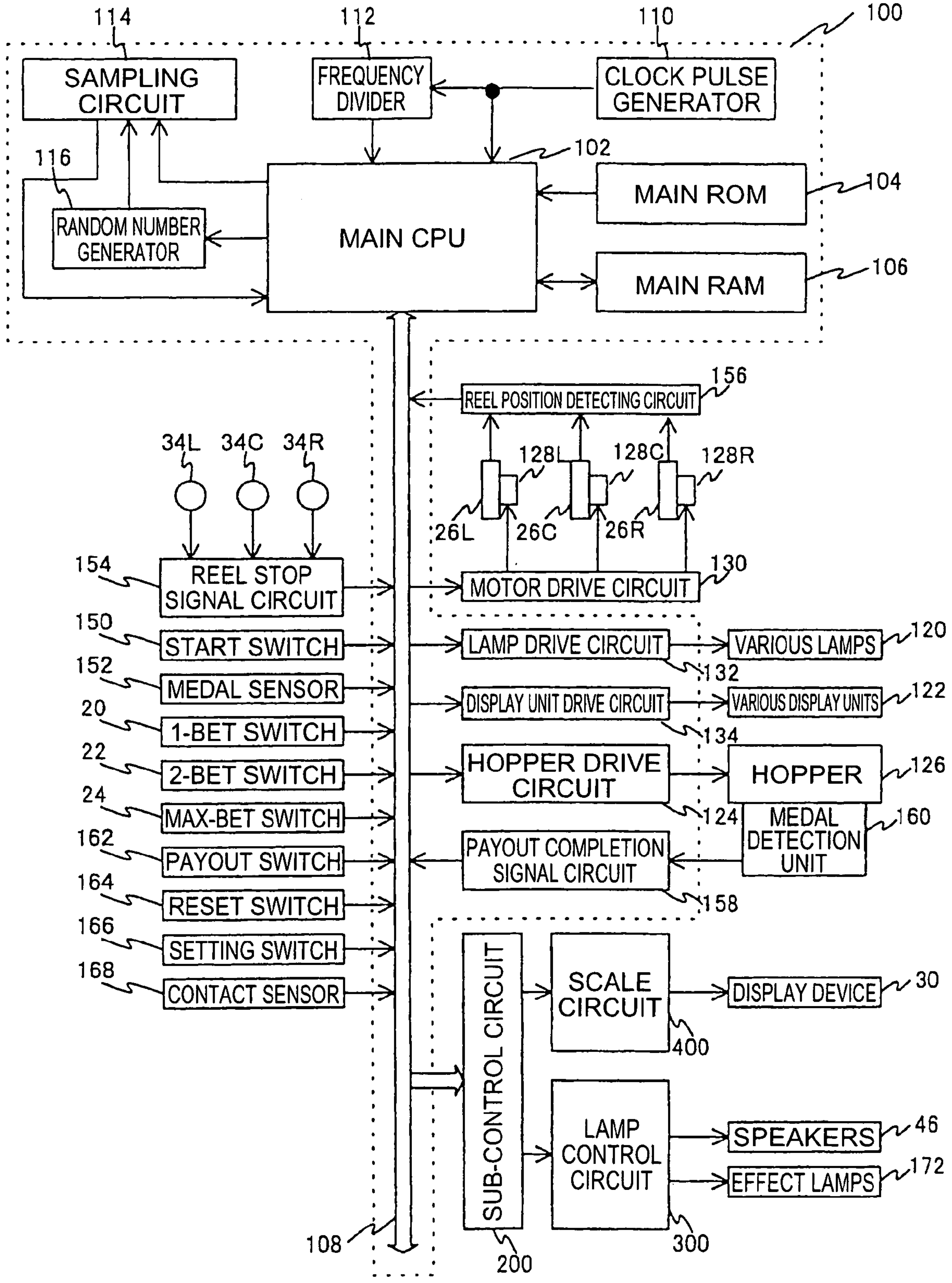

As shown in FIG. 8, the through-hole of the diffusion sheet 56 is the largest of the through-holes of the diffusion sheet 56, light conductive plate 57, and reflection sheet 58, and the through-hole of the light conductive plate 57 is larger than that of the reflection sheet 58.

As a result, "the group of sheet-type components includes a light conductive material and a light diffusive material which is provided forward of the light conductive material and in which an opening larger than the opening formed in the light conductive material is formed". Therefore, most of light to be emitted from the light conductive material enters the whole of the liquid crystal panel evenly after emitted from the light conductive material, or enters an area of the liquid crystal panel corresponding to the area other than the opening of the light diffusive material evenly after diffused by the light diffusive material. Since, however, the opening of the light conductive material is larger than the opening of the light diffusive material, the amount of light incident on the area of the liquid crystal panel corresponding to the area of the opening of the light diffusive material is less than the amount of light incident on the area of the liquid crystal panel corresponding to the area other than the opening of the light diffusive material.

Thus, the area of the liquid crystal panel which a player cannot help seeing when seeing the discrimination information is darker than that in case that the opening of the light conductive material and the opening of the light diffusive material are not provided like a conventional gaming machine, and thereby the discrimination information can be recognized clearly.

Furthermore, "the group of sheet-type components includes a light reflecting material and a light transmitting material which is provided forward of the light reflecting material and in which an opening larger than the opening formed in the light reflecting material is formed". Therefore, the plurality of symbols which are illegible for a player in case of a conventional gaming machine because most of the light emitted from the plurality of symbols is blocked by the light reflecting material having a high light-reflectivity, becomes more legible for a player than the conventional gaming machine because the light emitted from the plurality of symbols is less blocked by the light reflecting material than the conventional gaming machine because of the opening in the light reflecting material provided for the inventive gaming machine.

Furthermore, since the opening of the light reflecting material is smaller than the opening of the light transmitting material, it is considered that most of light emitted from the light transmitting material enters the substantial whole of the liquid crystal panel evenly after emitted to the opposite of the light reflecting material, or enters an area of the liquid crystal panel corresponding to the area other than the opening of the light reflecting material after reflected by the light reflecting material having a high light-reflectivity. But the amount of light incident on the area of the liquid crystal panel corresponding to the area of the opening of the light transmitting material is less than the amount of light incident on the area of the liquid crystal panel corresponding to the area other than the opening of the light transmitting material according to the presence or absence of incident light mentioned above.

Thus, the area of the liquid crystal panel which a player cannot help seeing when seeing the discrimination information is darker than that in case that the opening of the light reflective material and the opening of the light transmitting material are not provided like a conventional gaming machine, and thereby the discrimination information can be recognized clearly.

As a result, the present invention solves the problem that when a player plays a game at a gaming machine having a liquid crystal display device adhered forward of a reel variable-display unit, the discrimination information on the reels are illegible because of darkness and thereby the player is obstructed in pulling a lever or pushing a button with good timing while seeing the discrimination information, and provides an environment in which the player is absorbed in a game without losing interest in the game.

Above and below the liquid crystal display device 54, liquid crystal backlights 292 are provided which act as lighting devices for backlighting the liquid crystal display device 54. The liquid crystal backlights 292 are controlled so as to light when electric power is supplied. Thus, since the liquid crystal backlights 292 are always driven while electric power is always supplied, a player is able to identify the images displayed on the liquid crystal display device 54 visually and clearly. Cold-cathode tubes are mainly used as the liquid crystal backlights 292. However, the present invention is not limited thereto.

Furthermore, on the upper inside portion and lower inside portion of the display device 30, symbol illuminating lamps 60 are provided which act as lighting devices for lighting the symbols on the reels 26. The symbol illuminating lamps 60 are controlled so as to light when electric power is supplied. Thus, since the symbol illuminating lamps 60 are always driven, a player is able to identify the images visually and clearly.

Individual display components work in such a way that the symbols drawn on the symbol sheet 53 are always visually identified by a player without depending on the effect control state of the slot machine 10. The liquid crystal display device 54 provides areas in which image effects such as big hit effects and various notice effects are displayed.

In addition, near the front of the reel 26, lamp housings 62 (62L, 62C, and 62R) equipped with reel back lamps 63 (63L, 63C, and 63R) (see FIG. 9) respectively are provided.

[Structure of Reel Back Lamp]

Figure 9:
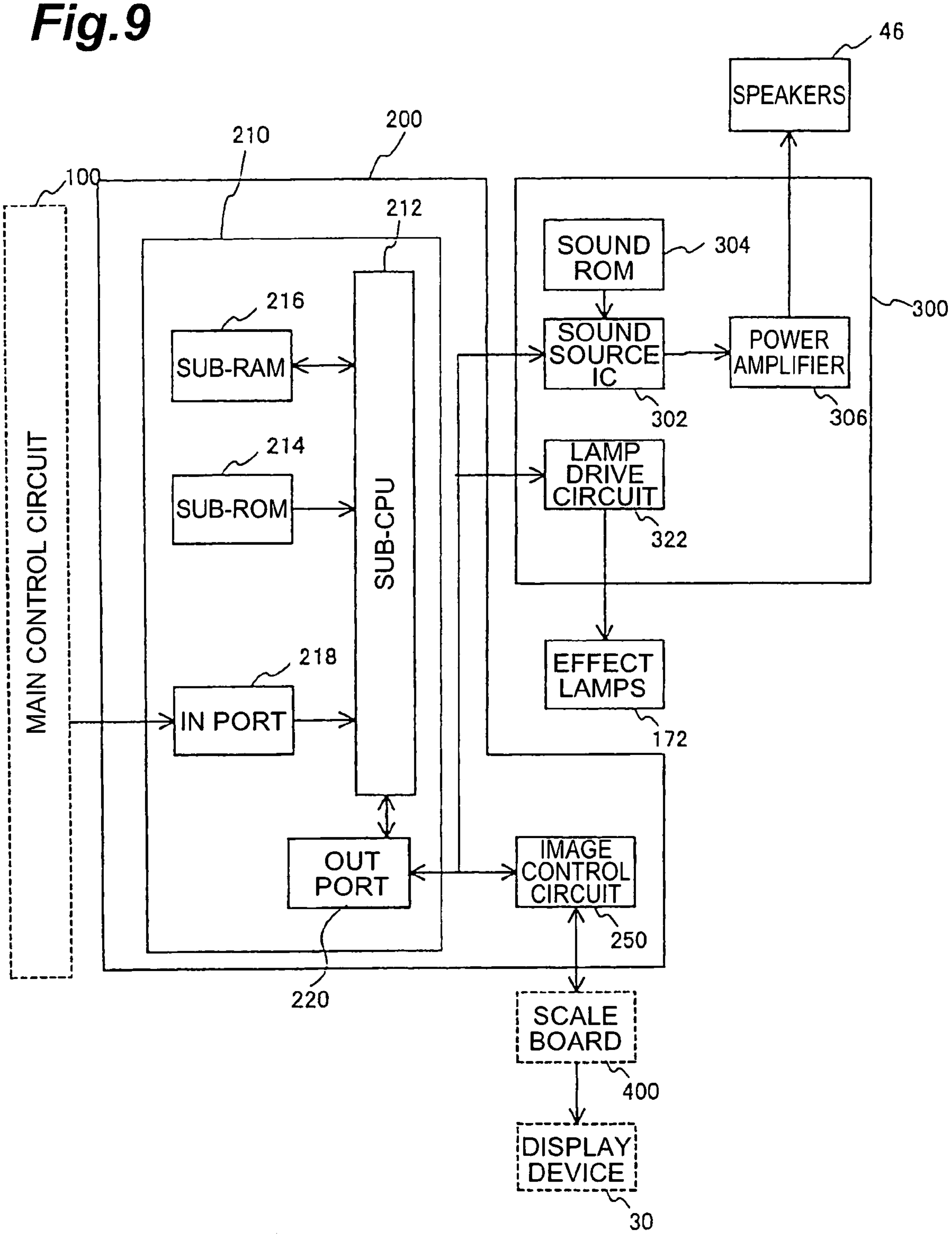

The reel back lamps 63 are described below with reference to FIG. 9, which is an enlarged schematic diagram showing the reels 26L, 26C, and 26R.

The reel bands 61L, 61C, and 61R of the reels 26L, 26C, and 26R are made of translucent film. On the surface of the reel bands 61L, 61C, and 61R, symbols such as "cherry" symbols and "7" symbols are printed with colored ink which is substantially light transparent. Masking treatment is applied to areas other than the symbol areas on the reel bands 61 using light blocking ink.

The lamp housings 62L, 62C, and 62R are provided at the back of the reel bands 61L, 61C, and 61R respectively so that the emission of each of the lamps does not interfere with other symbol areas. In the rooms of the lamp housings 62L, 62C, and 62R, the reel back lamps 63L, 63C, and 63R are provided respectively.

The lamp control circuit 300 turns the reel back lamps 63L, 63C, and 63R on and off based on the parameters determined by the sub-microcomputer 210.

For example, the lamp control circuit 300 turns on and off the reel back lamps 63L, 63C, and 63R corresponding to the symbols on a pay line when medals are paid out, or the lamp control circuit 300 has a mode of turning on and off the reel back lamps every internal winning combination, and when each winning flag is established, the lamp control circuit 300 turns the reel back lamps on and off in a mode corresponding to the flag to give the player a suggestion about which winning symbols are to be targeted.

Furthermore, the reel back lams 63L, 63C, and 63R usually continue to be lit in order to allow a player to visually identify symbols easily. Further, at power-on or reset, the reel back lamps 63L, 63C, and 63R are turned on so that the reel back lamps are effective.

[Configuration of Control Unit of Slot Machine]

FIG. 10 shows a circuit configuration including a main control unit 100 for controlling gaming process operations, peripheral devices electrically connected with the main control unit 100, and a sub-control unit 200, a lamp control circuit 300, and a scale circuit 400 for controlling the display device 30, speakers 46, and effect lamps 172 based on the control commands sent from the main control circuit 100.

The main control circuit 100 comprises a main CPU 102, a main ROM 104, a main RAM 106, an input/output bus 108, a clock pulse generator 110, a frequency divider 112, a sampling circuit 114, and a random number generator 116 which are disposed on a circuit board.

The main CPU 102 is capable of controlling various peripheral devices according to the programs stored in the main ROM 104, by outputting data signals or address signals to the peripheral devices through the input/output bus 108, and based on data signals or address signals which are input from the peripheral devices through the input/output bus 108. Further, a timer (not shown) is provided in the main CPU 102.

The main CPU 102 is connected with the main ROM 104. In the main ROM 104, various programs such as control programs for controlling the flows of the whole games of the slot machine 10, and initial data used for executing the control programs are stored.

For example, a probability drawing table used for the determination of random number sampling executed every time the start lever 32 is operated (start operation), a stop control table for determining how to stop the reels according to the operation of the stop button, a winning symbol combination table which corresponds to the symbols stationarily displayed based on the stop control table to determine the number of medals to be paid out, various control commands to be sent to the sub-control circuit 200, and the like are stored in the main ROM 104. Details of the probability drawing table, stop control table, and winning symbol combination table will be described later.

The various control commands include a "demonstration display command", a "start command", an "all-reel stop command", a "winning combination command", etc. The sub-control circuit 200 does not input any command, etc. to the main control circuit 100. Commands, etc. are sent in one direction from the main control circuit 100 to the sub-control circuit 200. The main control circuit 100 and the sub-control circuit 200 are connected through 16 data signal lines and one signal line. And, each of these commands comprises 2, 4, or 6 bytes which are sent as one command in 1, 2, or 3 sequences in order to be sent through 16 data signal lines.

The main CPU 102 is also connected with the main RAM 106 which stores the flags and the values of variables used in the above-mentioned programs.

The main CPU 102 is also connected with a clock pulse generator 110 and frequency divider 112 for generating base clock pulses, and a random number generator 116 and sampling circuit 114 for generating random numbers to be sampled.

The random number generator 116 generates random numbers within a fixed range of numbers, and the sampling circuit 114 samples one random number at an appropriate time after the start lever 32 has been operated.

Based on a random number sampled like this and the probability drawing table stored in the main ROM 104, an internal winning combination is determined. After an internal winning combination has been determined, a random number is sampled again for selecting the "stop control table" and the "stop table" contained in it.

The random number generator 116 generates random numbers within a fixed range of numbers, e.g., 0 to 65535 (the 16th power of 2). The present invention is not limited to generating random numbers from the random number generator 116, and may be configured to execute random number sampling on the operation program of the main CPU 102. In this case, the random number generator 116 and sampling circuit 114 may be omitted or may be retained for the backup of the random number sampling operation.

Furthermore, main input signal generating means for generating input signals necessary for the main CPU 102 to generate control commands include a start switch 150, a 1-BET switch 20, a 2-BET switch 22, a MAX-BET switch 24, a payout button 36, a medal sensor 152, a reel stop signal circuit 154, a reel position detecting circuit 156, a payout completion signal circuit 158, a payout switch 162, a reset switch 164, a setting switch 166, and a contact sensor 168. These input signal generating means are also connected with the main CPU 102 via the input/output bus 108.

The reel stop signal circuit 154 detects the operation of each of the stop buttons 34L, 34C, and 34R, and when detecting the operation, it sends a stop signal to the main CPU 102 through the input/output bus 108.

The start switch 150 detects the operation of the start lever 32, and when detecting the operation of the start lever 32, it send a start signal to the main CPU 102 through the input/output bus 108.

The medal sensor 152 detects a game medal inserted in the medal insertion slot 31, and when detecting a game medal inserted in the medal insertion slot 31, it sends a medal insertion signal to the main CPU 102 through the input/output bus 108.

The 1-BET switch 20 detects the operation of the 1-BET switch 20, and when detecting the operation of the 1-BET switch 20, it sends a 1-BET signal to the main CPU 102 through the input/output bus 108.

The 2-BET switch 22 detects the operation of the 2-BET switch 22, and when detecting the operation of the 2-BET switch 22, it sends a 2-BET signal to the main CPU 102 through the input/output bus 108.

The MAX-BET switch 24 detects the operation of the MAX-BET switch 24, and when detecting the operation of the MAX-BET switch 24, it sends a MAX-BET signal to the main CPU 102 through the input/output bus 108.

The payout switch 162 detects the operation of the payout button 36, and when detecting the operation of the payout button 36, it sends a deposited-medal adjusting signal to the main CPU 102 through the input/output bus 108.

The reset switch 164 is provided in the slot machine 10, and when detecting the operation of the reset switch 164, it sends a reset signal to the main CPU 102 through the input/output bus 108.

The setting switch 166 detects the operation of the setting button (not shown) provided in the slot machine 10, and when detecting the operation of the setting button, it sends a reset signal to the main CPU 102 through the input/output bus 108.

The reel position detecting circuit 156 receives pulse signals from the reel rotation sensors to send reel position signals for detecting the positions of the reels 26L, 26C, and 26R to the main CPU 102 through the input/output bus 108.

The payout completion signal circuit 158 detects that the payout of game medals has completed when the number counted by the medal detection unit 160 (the number of medals paid out from the hopper 126) has reached a predetermined number data, and then sends a payout completion signal representing the detection to the main CPU 102 through the input/output bus 108.

Devices the operations of which are controlled by the signals from the main control circuit 100 mainly include various lamps 120, various display units 122, a hopper 126 (including a drive unit for payout) for paying out a predetermined number of game medals according to the command of the hopper drive circuit 124, and stepping motors 128L, 128C, and 128R for rotating the reels 26L, 26C, and 26R. The various lamps 120 include the symbol illuminating lamps 60.

Furthermore, a motor drive circuit 130 for driving and controlling the stepping motors 128L, 128C, and 128R, the hopper drive circuit 124 for driving and controlling the hopper 126, a lamp drive circuit 132 for driving and controlling the various lamps, and a display unit drive circuit 134 for driving and controlling the various display units are connected with the output unit of the main CPU 102 via the input/output bus 108. These drive circuits receive control signals such as drive commands which are output from the main CPU 102 to control the operations of the various devices.

Devices the operations of which are controlled by the control signals from the main control circuit 100 also include a sub-control circuit 200.

The sub-control circuit 200 is connected with a lamp control circuit 300, a scale circuit 400, a display device 30, speakers 46 (46L and 46R), and effect lamps 172.

The display device 30 receives image signals supplied from the sub-control circuit 200 and scale circuit 400 to display images.

The speakers 46 receive voice signals supplied from the sub-control circuit 200 and lamp control circuit 300 to emit voices.

The effect lamps 172 receive effect signals supplied from the sub-control circuit 200 and lamp control circuit 300 to produce effects. The effect lamps 172 include the reel back lamps 63.

[Electrical Configuration of Sub-control Circuit]

Figure 11:
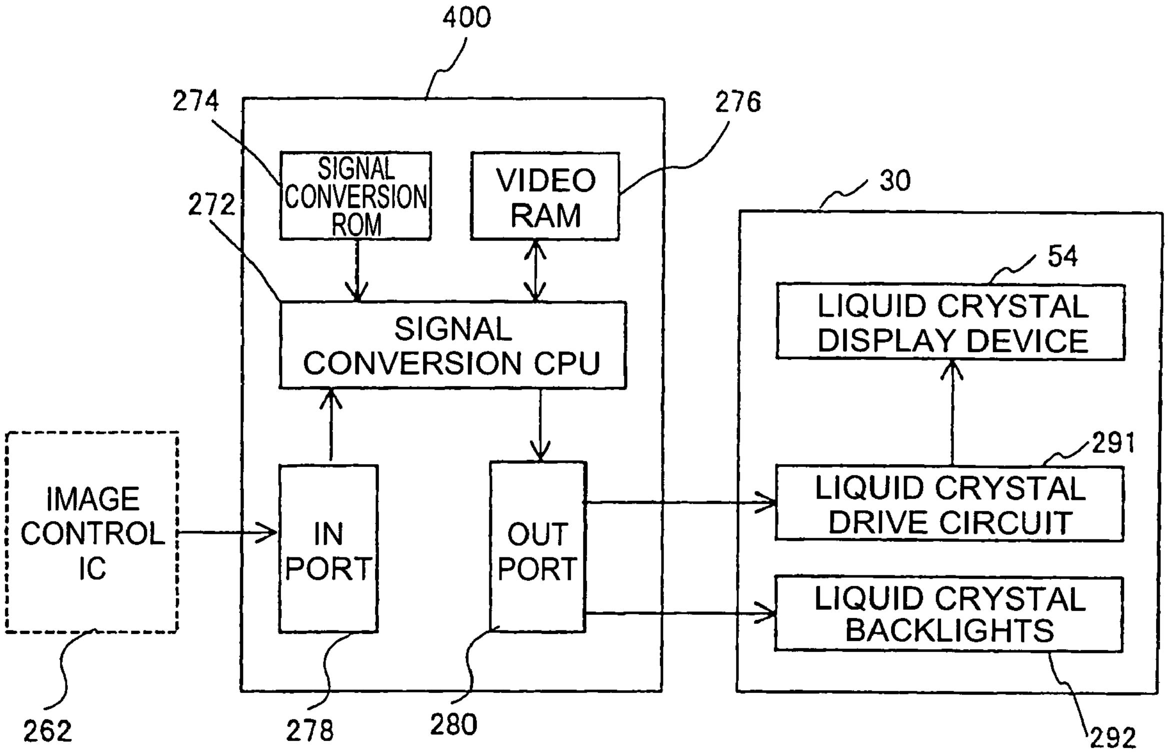
Figure 12:
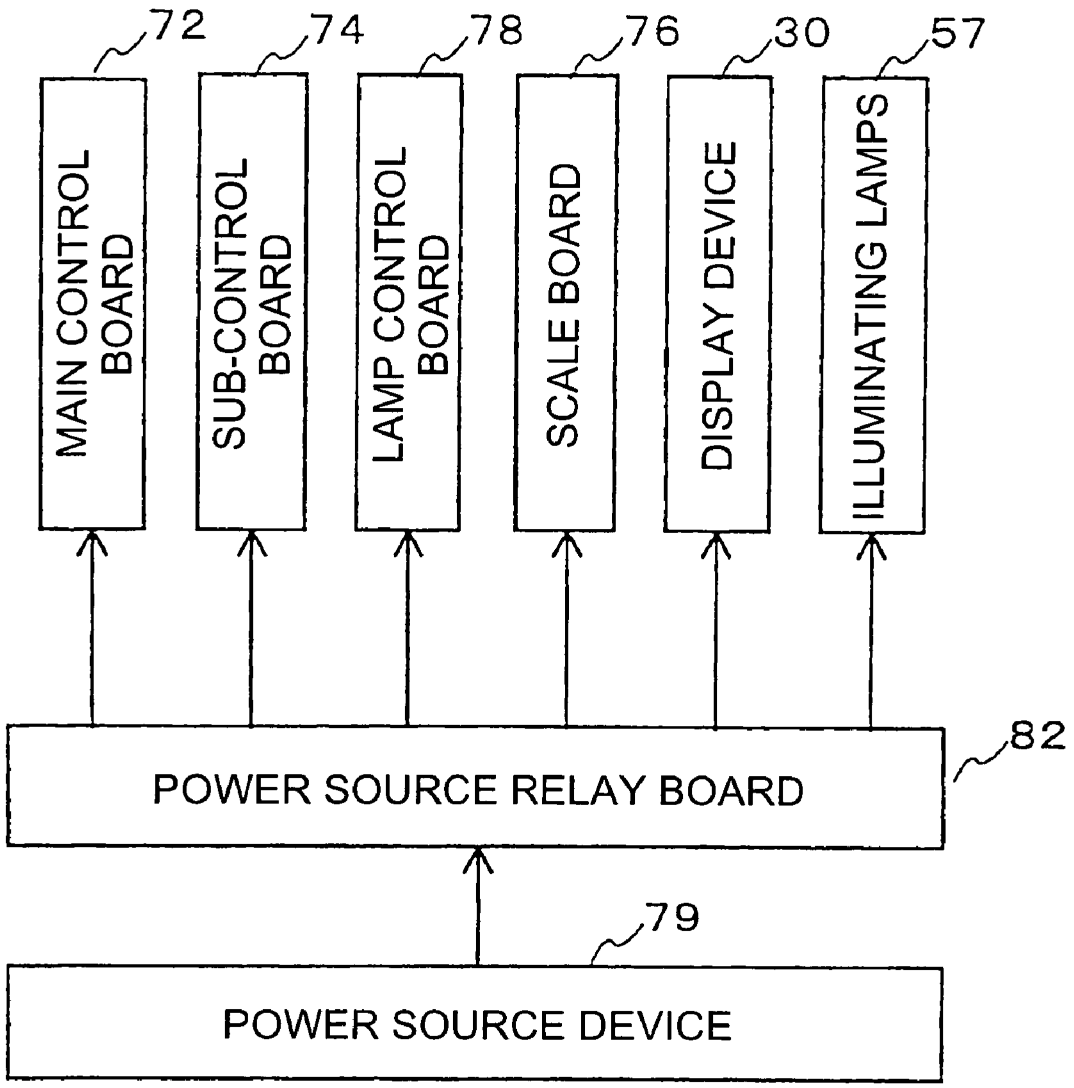

The sub-control circuit 200 is described below with reference to FIGS. 11 and 12. The block diagrams of FIGS. 11 and 12 show the configuration of the sub-control circuit 200.

The sub-control circuit 200 executes display control for the display device 30, voice output control for the speakers 46, and effect production control for the effect lamps 172 automatically or based on the control commands from the main control circuit 100.

The sub-control circuit 200 is mounted on a circuit board other than a circuit board on which the main control circuit 100 is mounted, and comprises a sub-microcomputer 210 as a main component of it, and an image control circuit 250 for controlling the display of the display device 30.

The sub-microcomputer 210 comprises a sub-CPU 212 for executing control operations according to the control commands sent from the main control circuit 100, a sub-ROM 214 in which control programs for the sub-microcomputer 210 are stored, a sub-RAM 216, an IN port 218, and an OUT port 220.

The sub-control circuit 200 does not have a clock pulse generator, a frequency divider, a random number generator, and a sampling circuit, but is configured so as to execute random number sampling on the operation program of the sub-CPU 212.

The sub-CPU 212 determines what effects are to be produced by the various effect control circuits to based on the game information commands sent from the main control circuit 100, and sends the contents of the determination to the various effect control circuits.

In the sub-ROM 214, programs for the communication sequence between the sub-CPU 212 and the main control circuit 100, an effect selection table for selecting various effects based on the received game information, sound sequence programs, etc. are stored.

The sub-RAM 216 provides work areas used when these control programs are executed.

The IN port 218 has a function of receiving game information such as images and voices supplied from the main control circuit 100, and supplying the game information to the sub-CPU 212.

The IN port 218 only supplies the game information from the main control circuit 100 to the sub-CPU 212, but does not supply any signal from the sub-CPU 212 to the main control circuit 100. For this reason, even if any malfunction has occurred in the sub-control circuit 200, the malfunction does not transfer to the main control circuit 100.

The OUT port 220 has a function of supplying image display signals to the image control circuit 250, a function of supplying voice generating signals to the sound source IC 302 of the lamp control circuit 300, and a function of supplying effect lamp signals to the lamp control circuit 300 in order to turn the effect lamps 172 on and off.

The image control circuit 250 comprises, as shown in FIG. 12, an image control CPU 252, an image control ROM 254, an image control RAM 256, an image ROM 258, a video RAM 260, an image control IC 262, and an IN port 264.

The image control CPU 252 receives parameters determined by the sub-microcomputer 210 through the IN port 264, and determines the contents of display on the display device 30 according to the image control sequence program stored in the image control ROM 254.

In the image control ROM 254, a sequence program for receiving image effect commands sent from the sub-microcomputer 210, an image control sequence program for controlling the image control IC 262, etc. are stored.

The image control RAM 256 provides work areas used when the image control program is executed.

The image control IC 262 creates images corresponding to the contents of display determined by the image control CPU 252, by using graphic data stored in the image ROM 258, stores the created images in the video RAM 260 temporarily, and supplies them with appropriate timing to the scale circuit 400 through the image control IC 262.

[Electrical Configuration of Lamp Control Circuit]

The lamp control circuit 300 is described below with reference to FIG. 11.

The lamp control circuit 300 comprises a sound source IC 302 for controlling sounds to be emitted from the speakers 46, a sound ROM 304 in which voice data is stored, a power amplifier 306 as an amplifier, and a lamp drive circuit 322 for driving the effect lamps 172.

[Electrical Configuration of Scale Circuit]

The scale circuit is described below with reference to FIG. 13.

The scale circuit 400 comprises a signal conversion CPU 272, a signal conversion ROM 274, a video RAM 276, an IN port 278, and an OUT port 280.

The signal conversion CPU 272 receives an image signal created by the image control circuit 250 through the IN port 278, and converts the display form on the display device 30, and stores the image signals and the display form into the video RAM 276, according to the signal conversion sequence program stored in the signal conversion ROM 274.

The signal conversion CPU 272 also supplies the image data stored in the video RAM 276 to the display device 30 through the OUT port, as enlarged image signals suitable for the display device 30.

Specifically, the signal conversion CPU 272 converts an image signal of a display size such as a VGA size to an enlarged image signal of a larger display size such as an XGA size.

In this embodiment, image data of VGA display size is converted to image data of XGA display size by enlarging it every bit. However, the present invention is not limited thereto. It is also possible that image data of VGA display size are received and the received image data of VGA display size are merged and converted to single image data of XGA display size.

In this embodiment, an image signal is converted to an enlarged image signal representing XGA-type, horizontal 1024 bits, vertical 768 bits, 8-bit red data, 8-bit green data, and 8-bit blue data. However, in the present invention, any display method in which an image is displayed in a larger size may be applicable, and the type of conversion, the number of horizontal bits, the number of vertical bits, the number of bits of gradation for each color, etc. are not limited to ones mentioned above.

The signal conversion CPU 272 is designed so as to receive image signals supplied from the sub-control circuit 200 in a predetermined cycle, and if the signal conversion CPU 272 has not received any normal image signal in a predetermined cycle, it stores image data into the video RAM 276 so that a predetermined image is displayed.

In other words, the signal conversion CPU 272 determines whether an image signal supplied from the sub-control circuit 200 is normal, and when it determines that the image signal is not normal i.e. abnormal, it allows the display device 30 to display a predetermined image to keep the state of image to be displayed on the display device 30. For example, the signal conversion CPU 272 watches a synchronizing signal to be input, and when there is no synchronizing signal or the synchronizing signal is not a defined one, the signal conversion CPU 272 executes transmission control (so-called "white output" control) on the display device 30.

Furthermore, although the signal conversion CPU 272 is configured, as described above, so as to allow the display device to display a predetermined image, the signal conversion CPU 272 stores image data into the video RAM 276 so that a relatively high transparent image which allows a player to visually identify the reels 26L, 26C, and 26R is displayed.

In the signal conversion ROM 274, a communication sequence program for the communication between the signal conversion CPU 272 and the image control circuit 250, a sequence program for converting a received image signal to an enlarged image signal, and a communication sequence program for supplying the enlarged image signal to the display device 30 through the OUT port 280 are stored.

The IN port 278 has a function of receiving an image signal supplied from the image control circuit 250 to supply the image signal to the signal conversion CPU 272. Furthermore, the OUT port 280 supplies an enlarged image signal converted by the image signal conversion circuit 270 to the display device 30, thereby producing an image display effect.

In this embodiment, image signals supplied to the image signal conversion circuit 270 are produced by a low voltage differential signaling (LVDS) method. However, the present invention is not limited thereto, and may be produced by various types of signaling methods. For example, it is preferable that image signals are produced by a differential method such as a LVDS method so that image signals are not susceptible to noise and thereby images are displayed without deterioration.

Furthermore, in this embodiment, an image signal supplied to the image signal conversion circuit 270 is an image signal of VGA (Video Graphics Array) size, and is converted to an enlarged image signal of XGA (extended Graphics Array) size by the processing of the image signal conversion circuit 270. In this embodiment, image signals of VGA size are supplied to the image signal conversion circuit 270. However, the present invention is not limited thereto, and image signals of various sizes may be supplied to the image signal conversion circuit 270.

[Configuration of Display Device]

The electrical configuration of the display device 30 is described below with reference to FIG. 13.

Figure 13:
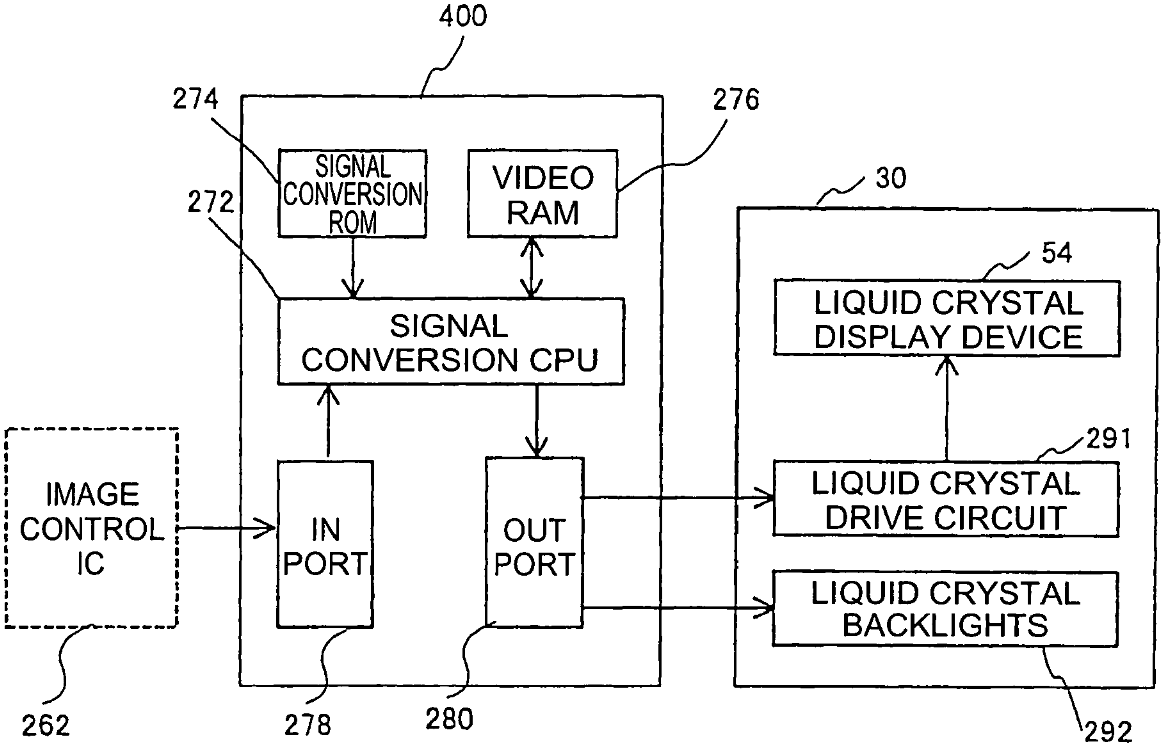

The display device 30 comprises, as shown in FIG. 13, a liquid crystal display device 54, a liquid crystal drive circuit 291, and liquid crystal backlights 292.

On the liquid crystal display device 54, various images are displayed based on the image signals supplied from the scale circuit 400 mentioned above.

The liquid crystal drive circuit 291 receives an image signal supplied from the scale circuit 400 mentioned above, and allows the liquid crystal display device 54 to display an image based on the image signal.

The liquid crystal backlights 292 illuminates the liquid crystal display device 54 at its back, thus causing the liquid crystal to display an image vividly.

[Configuration of Power Supply with Power Source Relay Board]

The electrical configuration of power supply with the power source device 79 is described below with reference to FIG. 14.

Figure 14:
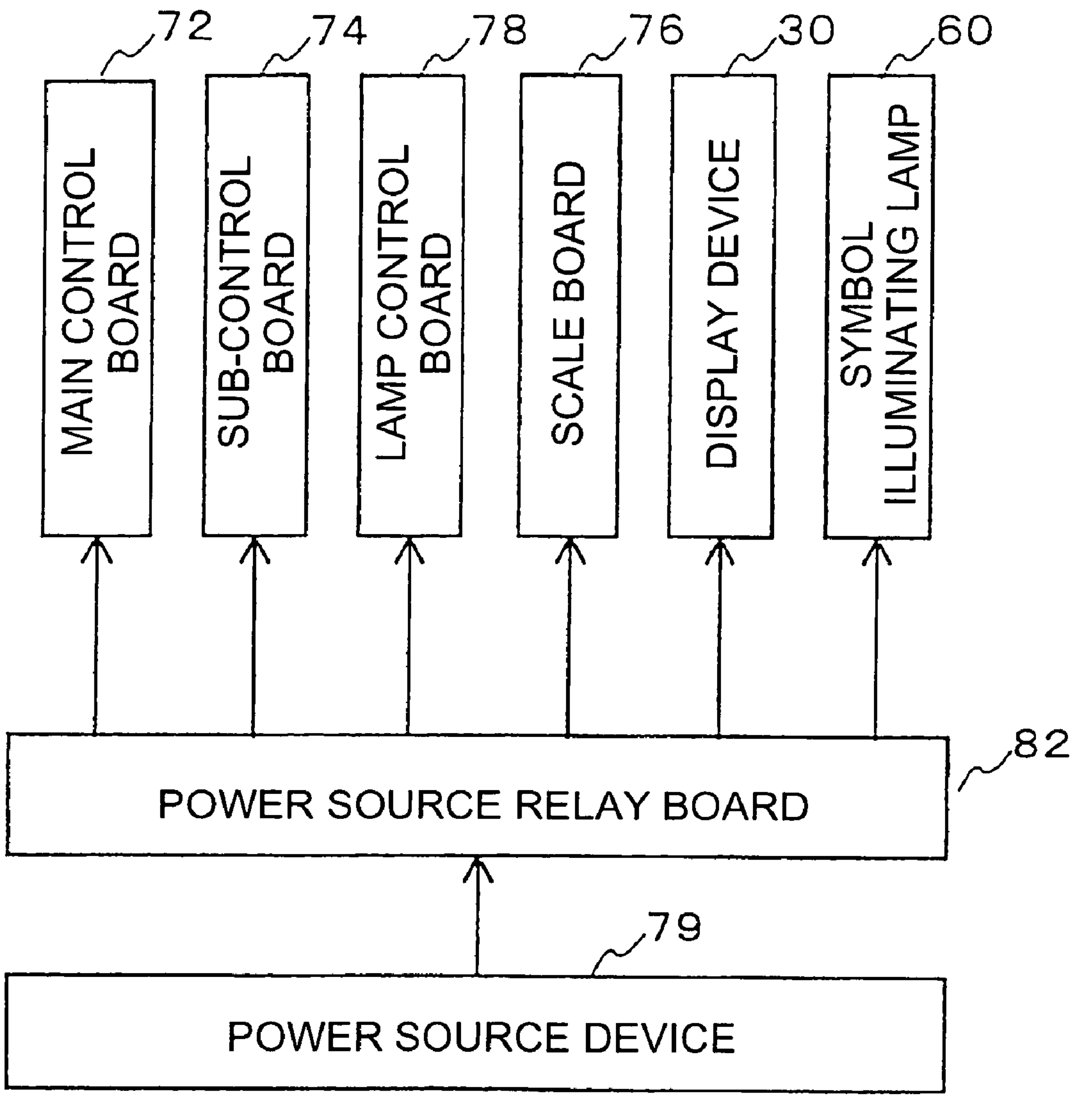

Electric power is supplied, as shown in FIG. 14, from the power source device 79 to the power source relay board 82, and then supplied to the main control board 72, the sub-control board 74, the lamp control board 78, the scale board 76, the display device 30, and the symbol illuminating lamps 60 through respective connection cables for power supply (not shown).

In this embodiment, the display device 30 is provided forward of the reels 26L, 26C, and 26R so that the display device 30 is allowed to display a relatively transparent image. However, the present invention is not limited thereto. The display device 30 may not be provided forward of the reels 26L, 26C, and 26R. Furthermore, there is no problem if the display device 30 lacks a function of displaying a relatively transparent image.

The effects described in this specification are only the most suitable effects derived from the present invention, and the effects of the present invention are not limited to ones described in this specification.

The present invention solves the problem that the discrimination information on the reels are illegible because of darkness and thereby a player is obstructed in pulling a lever or pushing a button with good timing while seeing the discrimination information, and provides an environment in which the player is absorbed in a game without losing interest in the game.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The effects described in this specification are only the most suitable effects derived from the present invention, and the effects of the present invention are not limited to ones described in this specification.

The present invention solves the problem that the discrimination information on the reels are illegible because of darkness and thereby a player is obstructed in pulling a lever or pushing a button with good timing while seeing the discrimination information, and provides an environment in which the player is absorbed in a game without losing interest in the game.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

This application is related to co-pending U.S. patent applications entitled "GAMING MACHINE" referred to as Ser. No. 10/697,942, "GAMING MACHINE" referred to as Ser. No. 10/697,946, "GAMING MACHINE" referred to as Ser. No. 10/697,244, "GAMING MACHINE" referred to as Ser. No. 10/697,441, "GAMING MACHINE" referred to as Ser. No. 10/697,249, "GAMING MACHINE" referred to as Ser. No. 10/697,004, "GAMING MACHINE" referred to as Ser. No. 10/697,251, "GAMING MACHINE" referred to as Ser. No. 10/697,254, "GAMING MACHINE" referred to as Ser. No. 10/697,005, "GAMING MACHINE" referred to as Ser. No. 10/697,006, "GAMING MACHINE" referred to as Ser. No. 10/697,259, "GAMING MACHINE" referred to as Ser. No. 10/697,707, "GAMING MACHINE" referred to as Ser. No. 10/697,042, "GAMING MACHINE" referred to as Ser. No. 10/697,158, "GAMING MACHINE" referred to as Ser. No. 10/697,039, "GAMING MACHINE" referred to as Ser. No. 10/697,157, "GAMING MACIHNE" referred to as Ser. No. 10/697,040, "GAMING MACHINE" referred to as Ser. No. 10/697,041, "GAMING MACHINE" referred to as Ser. No. 10/697,026, "GAMING MACHINE" referred to as Ser. No. 10/697,054, "GAMING MACHINE" referred to as Ser. No. 10/697,082, "GAMING MACHINE" referred to as Ser. No. 10/697,088, "GAMING MACHINE" referred to as Ser. No. 10/697,080, "GAMING MACHINE" referred to as Ser. No. 10/697,081, "GAMING MACHINE" referred to as Ser. No. 10/697,027, "GAMING MACHINE" referred to as Ser. No. 10/697,086, "GAMING MACHINE" referred to as Ser. No. 10/697,237, "GAMING MACHINE" referred to as Ser. No. 10/697,238, "GAMING MACHINE" referred to as Ser. No. 10/697,947, "GAMING MACHINE" referred to as Ser. No. 10/697,245, "GAMING MACHINE" referred to as Ser. No. 10/697,246, "GAMING MACHINE" referred to as Ser. No. 10/697,248, "GAMING MACHINE" referred to as Ser. No. 10/697,084, "GAMING MACHINE" referred to as Ser. No. 10/697,432, "GAMING MACHINE" referred to as Ser. No. 10/697,085, "GAMING MACHINE" referred to as Ser. No. 10/697,256, "GAMING MACHINE" referred to as Ser. No. 10/697,281, "GAMING MACHINE" referred to as Ser. No. 10/697,261, "GAMING MACHINE" referred to as Ser. No. 10/697,258, respectively, all the applications being filed on Oct. 31, 2003 herewith. The co-pending applications including specifications, drawings and claims are expressly incorporated herein by reference in their entirety.

What is claimed is:

1. A gaming machine comprising:

a rotary reel having a plurality of symbols on an outer periphery thereof;

a group of sheet members disposed in front of the rotary reel, the sheet members being laminated each other and each having an opening;

a liquid crystal panel disposed in front of the sheet members, wherein the plurality of symbols are recoginizable through the opening on each of the sheet members, from a front side of the gaming machine, and wherein each of the sheet members includes;

a light guiding material; and a light diffusion material disposed in front of the light guiding material and having a larger opening than an opening of the light guiding material.

2. A gaming machine comprising:

a rotary reel having a plurality of symbols on an outer periphery thereof;

a group of sheet members disposed in front of the rotary reel, the sheet members being laminated each other and each having an opening;

a liquid crystal panel disposed in front of the sheet members, wherein the plurality of symbols are recoginizable through the opening on each of the sheet members, from a front side of the gaming machine, and wherein each of the sheet members includes;

a light reflecting material; and a light transmitting material disposed in front of the light reflecting material and having a larger opening than an opening of the light reflecting material.

* * * * *